F. W. HAWKES.
REVETMENT.
APPLICATION FILED JAN. 17, 1908.
954,283.
Patented Apr. 5, 1910.
2 SHEETS—SHEET 1.
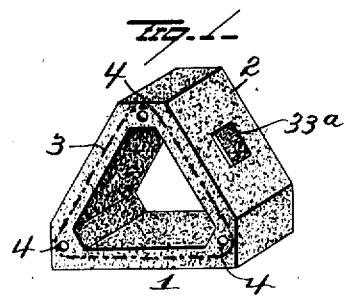
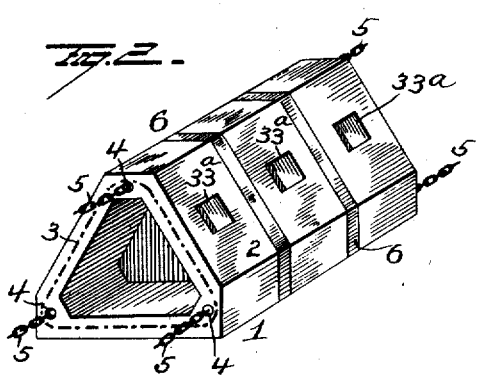
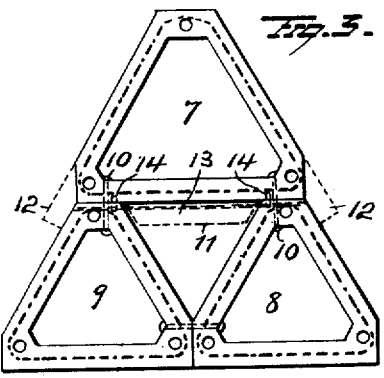
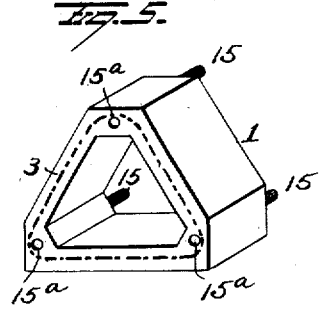
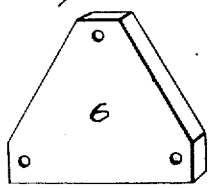
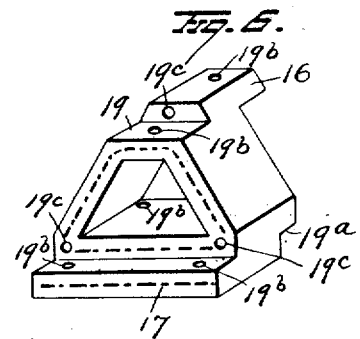
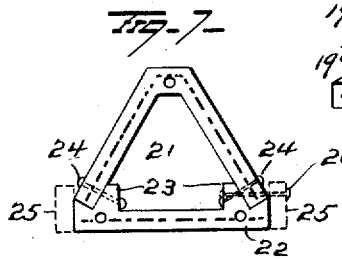
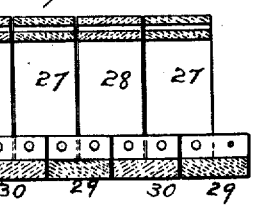
WITNESSES
E. L. Nottingham
G. J. Downing
INVENTOR
F. W. Hawkes
By H. A. Seymour
Attorney F. W. HAWKES.
REVETMENT.
APPLICATION FILED JAN. 17, 1908.
954,283.
Patented Apr. 5, 1910.
2 SHEETS—SHEET 2.
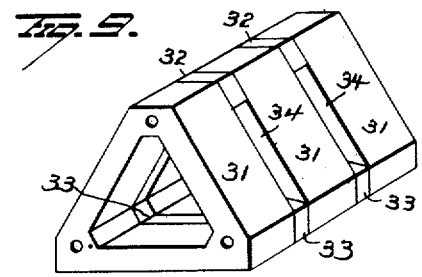
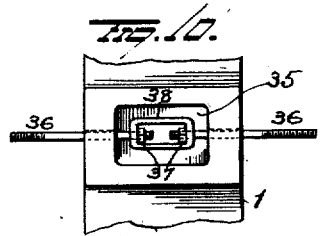
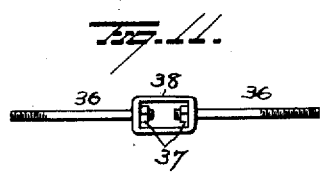
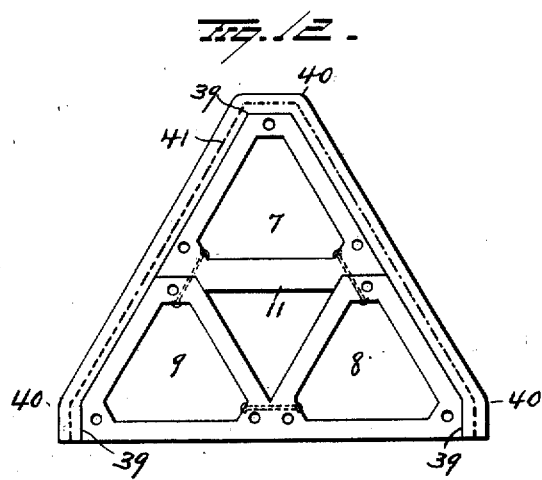
WITNESSES
INVENTOR
F. W. Hawkes
By H. A. Seymour
Attorney

UNITED STATES PATENT OFFICE.

FREDERIC W. HAWKES, OF NEW YORK, N. Y.

REVETMENT.

954,283.  Specification of Letters Patent.  Patented Apr. 5, 1910.

Application filed January 17, 1908. Serial No. 411,340.

*To all whom it may concern:*

Be it known that I, FREDERIC W. HAWKES, a resident of New York, in the county of New York and State of New York, have invented certain new and useful Improvements in Revetments; and I do hereby declare the following to be a full, clear, and exact description of the invention, such as will enable others skilled in the art to which it appertains to make and use the same.

My invention relates to improvements in revetments, for the control or restraint, within fixed bounds, of water courses of every description, both permanent and of temporary character, or of bodies of water, such as ponds, reservoirs, lakes, or of the ocean itself, the object of the invention being to provide economically an efficient yet easily constructed form of revetment for the protection of such exposed places as may be subject to damage through water, also to provide a means for deflecting water into suitable channels or to control the movement of water in volume, in any desired manner.

A further object is to provide economically an efficient breakwater either temporary or permanent, against waves or currents and further to provide a form of revetment which may readily be adapted to effect the retardation of water in volume, in such manner as to cause the precipitation of solids contained therein, such as sand or silt, and thus induce the formation of bars or made land.

A further object is to provide a form of revetment of such character that segments or units utilized in construction may if desired be cast or otherwise formed in part or in whole, at a point or points remote from the construction.

A further object is to provide a form of revetment of such character that the base of the same may be broadened economically to any desired extent and the structure carried to the finish point with expedition and economy, both of labor and materials.

A further object is to provide a suitable foundation for piers, bulkheads and structures of like character erected upon submerged or unstable bottoming.

With these and other objects in view the invention consists in certain novel features of construction and combinations and arrangements of parts as will be more fully hereinafter described and pointed out in the claims.

In the accompanying drawings, Figure 1 is a view in perspective of a segment of my improved revetment. Fig. 2 is a view in perspective of a series of segments similar to Fig. 1 arranged in longitudinal alinement. Fig. 3 is a view in cross section showing superimposed segments. Figs. 4, 5, 6, 7, 8, 9, 10, 11 and 12 are views illustrating modifications and the application of my improvements.

My improved revetment comprises one or more series of units or segments 1, each unit or segment consisting of a concrete shell 2 having metallic reinforcing 3. In the construction shown in Fig. 1, the shell has a general triangular form having thickened or reinforced corners, in which holes 4 are formed for the accommodation of fastening means whereby a series of units are secured together, in constructing a revetment. The fastening means above alluded to, may consist of chains, or rods 5 passing through the holes 4 and tying the units together, as shown in Fig. 2. Since it often happens that revetment work is carried on under great difficulties as regards exposure and the surroundings are frequently of such character as to render the mixing or handling of concrete and other materials for such construction a matter of the greatest difficulty, it is preferred in such cases that these segments be cast, or otherwise formed, either upon platforms or barges etc., convenient to the work or at some point or points remote thereto. In other words while segments of the character shown in Fig. 1 may be of any size desired they may be made portable and constructed in such manner as to admit of being readily assembled into any constructive form desired. Segments or units of the character shown in Fig. 1 may be of very narrow formation if desired and consist of a simple ring of metal incorporated within a proportionally larger and thicker segment of concrete. This metal reinforce may consist of deformed bars or of round iron of any desired form or shape, or metal plates and angle iron may be used or expanded metal, wire mesh or other suitable material may be utilized in any desired arrangement or combination. Preferably the reinforce of each unit is thoroughly incorporated within the concrete construction. The segments may be of any desired size, shape or length and may be of hollow, open, or of solid construction as will best suit the character of the revetment service desired.

In Fig. 3, a series of units is superimposed upon two series of alined units, 8, 9, firmly secured together, each unit to those next adjoining, longitudinally, transversely and perpendicularly. 10 indicates bolts or similar means of attachment, designed to thoroughly secure the unit series together in transverse and superimposed arrangement. 11, shows, by means of a dotted line, a lower conformation of unit 7 with purpose to form a saddle between the apex of units 8 and 9 and thus to distribute more evenly through the units 8 and 9 the pressures to which unit series 7 is subjected. A provision with a similar object in view is shown at 12, the dotted line indicating a downward extension of the base of unit 7 and forming, together with the conformation 11, a yoke resting upon the apex of units 8 and 9. If then a rod, bolt, cable, or similar device be passed transversely through these lower conformations 11 and 12 along the dotted line 13 and properly secured at the exterior walls of the construction, the units 7, 8 and 9 will thus be firmly secured together in transverse and superimposed arrangement. The bases of superimposed units may be perforated or spaced apart to permit the passage of sand etc., to lower units. Dowels as at 14 may be utilized to connect a unit or units of lower conformation with a unit or units superimposed thereon.

In Fig. 4, a spacing unit 6 of concrete is shown and is similar to the segments or units previously described except that the unit 6 is of massive rather than of hollow construction. The object of the hollowed or chambered type of construction hereinbefore described is to effect economy in the use of materials required for these constructions and to lighten the units with a view to portability and ease in handling. An extensive hollowed or chambered revetment, particularly along the course of a stream would, if such chambering were continuous, afford a means for the passage of water within the interior of the revetment, which is an objectionable feature, especially where it is desired to retain within the chambered recesses, sand, silt, or gravel for the purpose of adding mass to the construction. Solid units of the character shown in Fig. 4 inserted into the construction at suitable intervals, stop the progress of water within the revetment and at the same time add to the resistance transversely, of the revetment structure.

In the form of unit shown in Fig. 5, dowels are provided at 15 designed to fit into corresponding recesses (as at 15ª) in the unit next succeeding. These dowels may be formed of any desired material, such for instance as metal covered with concrete, and may be keyed into position, thus firmly uniting the units in longitudinal alinement.

In Fig. 6 is shown a form of unit designed to interlock with the units next in longitudinal series, being provided with lips 16 and 17 to interlock with or overlap the notched or recessed portion, such as shown at 19, 19ª, of the next succeeding unit. The interlock or overlap of these units may then be still further secured in longitudinal alinement by means of bolts passed through holes at 19$^b$ and 19$^c$.

In the construction shown in Fig. 7 the base 22 of the unit is formed separately from the arch 21. The uprights 23 are designed to receive side members of the arch 21 at 24 where bolts or other suitable means of attachment to the base 23 are provided. The dotted line 25 shows a variation of the base line for the purpose of providing a more firm support for the arch 21 which may then be keyed into place by a bolt or other device at the dotted line 26. Among the advantages incident to the form of construction shown in Fig. 7 is great simplicity in manufacture, increased portability and ease in handling and the fact that the arches 21 may be "nested" in storage or in transportation, thus occupying less space.

In Fig. 8 is shown a longitudinal section of the two piece units shown in Fig. 7, the perpendicular arches 27 and 28 being secured in staggered formation to the base blocks 29 and 30 with a view to utilize the maximum resistance to pressure, obtainable from units of this character. It is desirable also where units in series are formed parallel, one to the other, either upon the horizontal plane or superimposed as shown in Fig. 3 that the staggered formation as regards the transverse or cross section arrangement of the units, should be followed.

In Fig. 9 the units 31, 31, 31, are shown spaced apart by apex blocks 32, 32 and at the base by base blocks 33, 33, extending transversely across the structure. The spaces or openings indicated at 34, 34 are of such character as to admit the passage of a limited amount of water through the structure, the purpose being to retard the flow of water in volume sufficiently to cause the precipitation of solids, such as sand or silt, contained therein and in this manner induce the formation of bars or "made land" within the protected area. It is apparent that the ingress or egress of water through a structure of the character shown in Fig. 9 may readily be controlled in any manner desired, either by means of the spacings in the structure or by the arrangement of same. It is evident that if the spaces in the structure are staggered either horizontally or perpendicularly, with reference to a cross section of the structure, that the degree of retardation of flow in either direction will be much greater than where the spacings are arranged in alinement transversely of the structure. The spacing blocks 32, 32 and 33 33 may if desired be formed integrally with the units 31, 31.

Where it is desired to fill the chambered recesses of these constructions, with broken stone, sand or silt etc., in order to oppose a greater mass to the attacks of water in volume, this may be effected progressively as the units are assembled, or the structure may be spaced or perforated in such manner as to permit of being loaded or filled in the manner indicated.

In streams carrying solids, such as sand or sediment, perforations such as shown at 33ª Fig. 2 may be provided in the exposed side of the construction, the obverse side being closed, which will induce the precipitation of the solid particles within the recesses of the structure, the principle being identical with that previously instanced in the formation of made land etc.

In cases where wave action is encountered as upon the shores of the sea, the obverse side of the construction, rather than the exposed side, should be perforated, in order that the reflex action of waves or tides may be availed of in filling the hollowed out portion of the revetment.

Where the action of the water cannot be depended upon to serve the purpose, sand, silt, low grade cement, or other cheap material may be pumped or otherwise deposited within the construction, filling the recesses to any desired extent, and the perforations of the outer shells of the units be then readily closed.

It is desirable in all these constructions that the metallic reinforce of both of the units and of the construction as assembled, together with the metallic attachments and connections, chains, bolts, braces, hooks, shackles, etc., of the same, should be protected from corrosion, either through incorporating the metal in concrete or other material affording insulation, or through treatment of the metal itself.

The unit method of construction herein described permits the incorporation of the reinforcement within concrete or other insulating material. All openings for bolt-heads etc., may be countersunk and keyed and after assembling may be filled with fresh concrete and permitted to set.

Figs. 10 and 11 show a method for securing the various segments or units together in longitudinal alinement. In Fig. 10, 35 shows a countersink at the angle of the unit. Bolts 36 in longitudinal alinement are passed through holes in the unit and provided at their inner ends with screw heads at 37, within a metal drawbar frame 38 located in the countersink 35. The anterior ends of the bolts terminate similarly within a separate unit or units of the series. Fig. 11 is an enlarged view of the drawbar frame 70 shown in Fig. 10. The nuts 37 and bolts shown in Fig. 10. The nuts 37 and bolts shown in Fig. 10 when tightened will draw up the units into close alinement and the same method may be extended laterally and perpendicularly to embrace units in parallel or superimposed alinement. The points of contact between the several units may be still further bonded together by the application of concrete mortar to the interstices between the units while at the same time yielding increased protection to the metal attaching devices. In forming the units to receive reinforce or attaching devices, the concrete may be slotted or countersunk in any manner desired and may be beveled to receive an application of concrete mortar after the installation of the reinforce or attaching devices. When the reinforce and attachments of whatever kind have been installed the concrete mortar may be applied up to the finish line of the construction thus protecting the metal parts.

Fig. 13 shows a cross section of units assembled as in Fig. 3 the exterior or finish line of the construction being shown at 39, 39, 39. If now the ordinary wire mesh of commerce, expanded metal, metal lath or equal be spread over the entire structure, furred out or otherwise as desired, along the dotted line 41, 41, 41, and concrete brought out to the new finish line at Nos. 40, 40, 40, and permitted to set, the strength of the structure may in this manner be increased as desired. Similarly a reinforced surfacing of the character indicated may be applied to the interior spaces formed by hollow units assembled in series or to either the exterior or interior of a single series of units in longitudinal alinement, or the application may be made locally with a view to closing open spaces in the construction or to secure or strengthen the joints between the units, or exclude water therefrom. The ease with which constructions of the character shown may be assembled and afterward taken apart and removed renders this form of construction of peculiar value for the shore protection of resorts, etc., from storms during the closed season, the removal of such construction leaving a clear sea way during the open season.

While it is designed that the completed revetment structure shall in large measure provide its own foundation, the bottoming upon which the structure will rest, may be leveled or otherwise prepared to receive it: Spiles may be driven at suitable intervals to sustain or hold the structure in place and attachment made thereto, or other devices such as exterior anchorage with suitable attachment thereto may be utilized.

Having fully described my invention what I claim as new and desire to secure by Letters-Patent, is:—

1. A revetment comprising a series of alined hollow units, and interposed solid units.

2. A revetment comprising a series of alined hollow units and interposed solid units, the exterior shell of said hollow units being perforated or slotted in such manner that water carrying sand or sediment may be admitted into the hollows of said units substantially as set forth.

3. In a revetment comprising alined hollow units and interposed solid units, means for admitting the passage of water through the revetment structure and means for retarding the flow of water through the revetment structure, substantially as set forth.

4. A revetment comprising alined hollow units and interposed solid units, the engaging members of said units being formed in such manner that when properly alined the units will interlock one with another, substantially as set forth.

In testimony whereof, I have signed this specification in the presence of two subscribing witnesses.

FREDERIC W. HAWKES.

Witnesses:
H. IRVING HANCOCK,
N. S. HANCOCK.